US008589547B2

(12) United States Patent
Costa-Requena et al.

(10) Patent No.: US 8,589,547 B2
(45) Date of Patent: Nov. 19, 2013

(54) SIDE CHANNEL FOR MEMBERSHIP MANAGEMENT WITHIN CONFERENCE CONTROL

(75) Inventors: Jose Costa-Requena, Helsinki (FI); Petri Koskelainen, Rauma (FI); Ignacio Almar, Barcelona (ES); Inmaculada Espigares, Helsinki (FI); Oriol Ribera, Barcelona (ES)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/270,042

(22) Filed: Oct. 11, 2002

(65) Prior Publication Data

US 2004/0071099 A1    Apr. 15, 2004

(51) Int. Cl.
*G06F 15/16* (2006.01)
*G06F 15/173* (2006.01)

(52) U.S. Cl.
USPC .......................................... 709/226; 709/229

(58) Field of Classification Search
USPC ............................... 709/225, 226.229, 204
See application file for complete search history.

(56) References Cited

U.S. PATENT DOCUMENTS

| | | | | |
|---|---|---|---|---|
| 5,754,775 A | * | 5/1998 | Adamson et al. | 709/204 |
| 5,907,324 A | * | 5/1999 | Larson et al. | 345/753 |
| 6,567,844 B2 | * | 5/2003 | Fukasawa | 709/205 |
| 6,594,673 B1 | * | 7/2003 | Smith et al. | 707/104.1 |
| 6,658,450 B1 | * | 12/2003 | Balakrishnan et al. | 718/106 |
| 6,665,707 B1 | * | 12/2003 | Bates et al. | 709/204 |
| 6,681,252 B1 | * | 1/2004 | Schuster et al. | 709/227 |

FOREIGN PATENT DOCUMENTS

| | | |
|---|---|---|
| WO | WO 01/52072 A1 | 7/2001 |
| WO | WO 02/09448 A2 | 1/2002 |

OTHER PUBLICATIONS

O. Levin Radvision, R. Even Polycom, A. Zmolek Avaya, D. Petrie Pingtel, and P. Koskelainen, Columbia University: *Conferencing Requirements for SIP Based Applications*, pp. 1-18, Apr. 2002. http://www.potaroo.net/ietf/xld-ids/draft-levin-sipping-conferencing-requirements-00.txt.

O. Levin Radvision, R. Even Polycom, A. Zmolek Avaya, D. Petrie Pingtel, and P. Koskelainen, Columbia U., S. Sen Nortel: *Requirements for Tightly Coupled SIP Conferencing*, pp. 1-15, Jul. 2002. http://www.cs.columbia.edu/~hgs/sip/drafts/draft-levin-sipping-conferencing-requirements-01.txt.

Koskelainen, Schulzrinne, and Wu, Nokia, Columbia U., Draft: *Additional Requirements to Conferencing*, pp. 1-10, Apr. 29, 2002. http://www.ietf.org/internet-drafts/draft-koskelainen-sipping-conf-requirements-00.txt.

Gonzalo Camarillo, Jan Holler, Goran AP Eriksson Ericsson, and Henning Schulzrinne, Columbia University: *Grouping of Media Lines in SDP*, pp. 1-18, Feb. 2002. http://www.ietf.org/proceedings/02jul/I-D/draft-ietf-mmusic-fid-06.txt.

Wu, Koskelainen, Schulzrinne, and Chen, Columbia University: *Use of SIP and SOAP for Conference Floor Control*, pp. 1-26, Apr. 19, 2002. http://www.ietf.org/ietf/lid-abstracts.txt.

(Continued)

*Primary Examiner* — Larry Donaghue
(74) *Attorney, Agent, or Firm* — Ditthavong Mori & Steiner, P.C.

(57) ABSTRACT

A method and system of providing group management for IMS conferencing services involves creating side control channels for membership control services. The membership control channel can use Client Group Management Protocol (CGMP) or alternate group management protocols. The membership channel can use HTTP, SIP, or other transport protocols. Group management protocol primitives and procedure calls can be communicated using SOAP or other XML-based protocols.

38 Claims, 10 Drawing Sheets

(56) References Cited

OTHER PUBLICATIONS

Petri Koskelainen and Henning Schulzrinne, and Xiaotao Wu, *A SIP-based Conference Control Framework*, pp. 1-12, May 12-14, 2002. http://216.239.57.100/search?q=cache:WB79vJtGvNOC:www.cs.columbia.edu/~xiaotaow/rer/Resear. . . .

Andy Watson, Annex to Report No. 20, Report from the UMTS Forum: *Technology Enablers, Annex to UMTS Forum Report: IMS Service Vision for 3G Markets*, UMTS Forum, pp. 1-22, Apr. 2002.

European Office action for corresponding EP App. No. 03 751 087.2-2416 dated Mar. 16, 2011, pp. 1-7.

European Search Report for corresponding EP App. No. 03751087.2-2416 dated Apr. 21, 2010, pp. 1-3.

* cited by examiner

*FIG. 1*

```
        ⎧ v=0
        ⎪ o=Foo 289083124 289083124 IN IP4 foo.example.com
  202  ⎨  s=Conference Session
        ⎪ t=0 0
        ⎩ c=IN IP4 224.2.17.12/127
  204 ──── a=type:moderated
  206 ──── a=group:FL 1 2 4
  208 ──── a=group:FL 3 5
  210 ──⎡ m=audio 10000 RTP/AVP 0
         ⎣ a=mid:1
  212 ──⎡ m=video 20000 RTP/AVP 31
         ⎣ a=mid:2
  214 ──⎡ m=application 30000 udp wb
         ⎣ a=mid:3
  216 ──⎡ m=control 80 HTTP SOAP
         ⎣ a=mid:4
  218 ──⎡ m=control 5060 SIP SOAP
         ⎣ a=mid:5
  220 ──⎡ m=control 80 HTTP SOAP SOAP/CGMP XML/CGMP
         ⎣ a=mid:6
  222 ──⎡ m=control 5060 SIP SOAP SIP/PUBLISH SOAP/CGMP XML/CGMP
         ⎣ a=mid:7
```

```
POST http://conference.com/GM HTTP/1.1
Content-Type: application/soap
Content-Length: XX <SOAP-ENV:Envelope
    xmlns:SOAP-ENV="http://schemas.xmlsoap.org/soap/
envelope/"
    SOAP-ENV:encodingStyle="http://schemas.xmlsoap.org/
soap/encoding/">
        <SOAP-ENV:Body>
<m:CreateGroupRequest xmlns:m="urn:cgmp-interface-
messageType">
<UserID> sip: user1pc@domain.com </UserID>
<ApplicationID> presence </ApplicationID>
<GroupName> My Friends </GroupName>
<GroupMembersList> sip:jennifer@sonera.com,
sip:john@sonera.com </GroupMembersList>
<Visibility>   ... </Visibility>
<GroupProperties> ... </GroupProperties>
</m:CreateGroupRequest>
        </SOAP-ENV:Body>
    </SOAP-ENV:Envelope>
```

- 602 → `<m:CreateGroupRequest ...>`
- 604 → `<GroupMembersList>`
- 600 (overall)

*FIG. 6*

```
HTTP/1.1 200 OK
Content-Type: application/soap
Content-Length: XXXX

<SOAP-ENV:Envelope
    xmlns:SOAP-ENV="http://schemas.xmlsoap.org/soap/
envelope/"
    SOAP-ENV:encodingStyle="http://schemas.xmlsoap.org/
soap/encoding/">
        <SOAP-ENV:Body>
<m:CreateGroupResponse xmlns:m="urn:cgmp-interface-
messageType">
    <groupID> sip: allowlist@conference.com </groupID>
        </m:CreateGroupResponse>
        </SOAP-ENV:Body>

</SOAP-ENV:Envelope>
```

- 702 → `<groupID>`
- 700 (overall)

SIDE CHANNEL FOR MEMBERSHIP MANAGEMENT WITHIN CONFERENCE CONTROL

FIELD OF THE INVENTION

The present invention relates to communications within IP Multimedia Subsystems (IMS) and in particular IMS conferencing services.

BACKGROUND OF THE INVENTION

Internet Protocol (IP) Multimedia Subsystem (IMS) provides a framework for offering real-time, person-to-person communication services that combine the best aspects of switched networks (telephony) and packet networks (IP). IMS integrates speech and video telephony with digital services such as telemetry, telecommand, text messaging, etc.

Due to the vast array of protocols and media that will be handled by IMS, open and extensible protocols are needed define parameters used for various IMS services such as transport methods, stream and data formats, and directory services. One such protocol is Session Initiation Protocol (SIP). As defined in RFC3261, SIP is "an application-layer control (signaling) protocol for creating, modifying, and terminating sessions with one or more participants. These sessions include Internet telephone calls, multimedia distribution, and multimedia conferences."

When establishing multimedia conferences, there are a number of communication channels that must be established using different protocols. One such channel is known as "floor control". Floor control is the arbitration of control of the media and/or data streams. Since only one user should be speaking or controlling a cursor at any given time, the establishing and passing of floor control will require one of the communication channels be set up with all users.

Media signaling requires another communications channel. The floor control can therefore be considered as a side channel, and the media signaling would be considered a main channel within the conference. The SIP provides a means for establishing channels such as media signaling, floor control, and other side channels that may be needed. These channels can be established through SIP methods such as "PUBLISH" for floor control and "INVITE" for media signaling. Other new SIP methods could also be proposed for these purposes.

Another aspect of multimedia conferences is group management. Group management involves, among other things, establishing the users who are invited to the conference and establishing privileges of users.

What is needed in the art is a way to perform group management in IMS conference services. Further needed is a system that utilizes available protocols that are open and extensible. The present invention fulfills these and other needs, and addresses other deficiencies of prior art implementations.

SUMMARY OF THE INVENTION

To overcome the limitations in the prior art described above, and to overcome other limitations that will become apparent upon reading and understanding the present specification, the present invention discloses a method for group management of multimedia conference sessions between at least one conference server and a plurality user terminals coupled to the conference server via a network.

In accordance with one embodiment of the invention, the method involves creating a conference request at a moderator terminal. The conference request is configured by specifying a member list comprising a plurality of user identity records. The conference request is communicated to the conference server over a membership control channel. A publishable reference to the member list is created at the conference server. The publishable reference defines a conference session.

The method may further involve creating a floor control list from the member list. The floor control list is usable for allowing floor control access to the conference session as part of floor control management. The member list may include a mass invitation list or an access list. The membership control channel may use HTTP or SIP as a transportation protocol. The membership control channel can use an XML based protocol for group management, including CGMP or SOAP.

In one aspect, the method further involves modifying the member list to add and remove user identity records from the member lists. Modifying the member list may occur while the plurality of user terminals are engaged in an active multimedia conference.

In another embodiment of the present invention, a conferencing server is coupled to a plurality of terminals over a network. Each terminal is coupled to the conferencing server via concurrently active control channels and media channels. The conferencing server includes a memory configured to store a plurality of member lists. Each member list includes one or more user identity records.

The conferencing server further includes a processing system coupled to the memory and configured to identify at least one member list and publish the at least one member list to one or more of the terminals. A data transmission module is coupled to the processing system to communicate with the at least one member list to a terminal over one of the control channels (defined as a membership management channel) to establish a multimedia conference over the membership management channel.

One of the control channels of the conferencing server may be defined as a floor control channel. The processing system in this arrangement is configured to create a floor control list from the at least one member list. The data transmission module communicates the floor control list to a terminal over the floor control channel.

The member list of the conferencing server may include a mass invitation list or an access list. The membership control channel may use HTTP or SIP as a transportation protocol. The membership control channel may use an XML based protocol for group management, including CGMP, SOAP or a Remote Procedure Call (RPC) with similar functionality.

The processing system of the conferencing server may be configured to add and remove user identity records from one or more of the member lists. Adding and removing user identity records from the member lists may occur while users corresponding to one or more identity records are engaged in an active multimedia conference.

In another embodiment of the present invention, a multimedia system, includes a plurality of user agents that are engagable in a multimedia conference. At least one moderator terminal is configured to create a member list request. At least one conference server is configured to receive a member list request from the moderator terminal over a membership management channel established between the conference server and the moderator terminal.

The conference server is also configured to store the member list request as a member list. The member list includes one or more user identity records. The conference server communicates the member list to the plurality of user agents.

The conference server may be configured to create a floor control list from the member list and communicate the floor control list to at least one of the user agents over a floor control channel. The member list request may include a mass invitation list request or an access list request. The membership management channel may use SIP or HTTP for transport. The membership management channel may use an XML based protocol for group management, including CGMP and SOAP.

The conference server may be configured to add and remove user identity records from the member list. The conference server may be configured to add and remove user identity records from the member list while user agents are engaged in an active multimedia conference. The conference server may be configured to receive a subscription for conference status changes and membership status changes. The conference server may also be configured to send a synchronous and/or asynchronous membership status change notification.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail herein. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE VARIOUS EMBODIMENTS

A portion of the disclosure of this patent document contains material which is subject to copyright protection. The copyright owner has no objection to the reproduction of the patent document or the patent disclosure, as it appears in the Patent and Trademark Office patent file or records, but otherwise reserves all copyrights and associated copyright ownership privileges.

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

The present invention involves providing group management functions within IMS services, particularly conferencing services. Group management generally involves creating conference membership groups for purposes of access control, invitation, floor control, and tracking member status.

Figure 1:
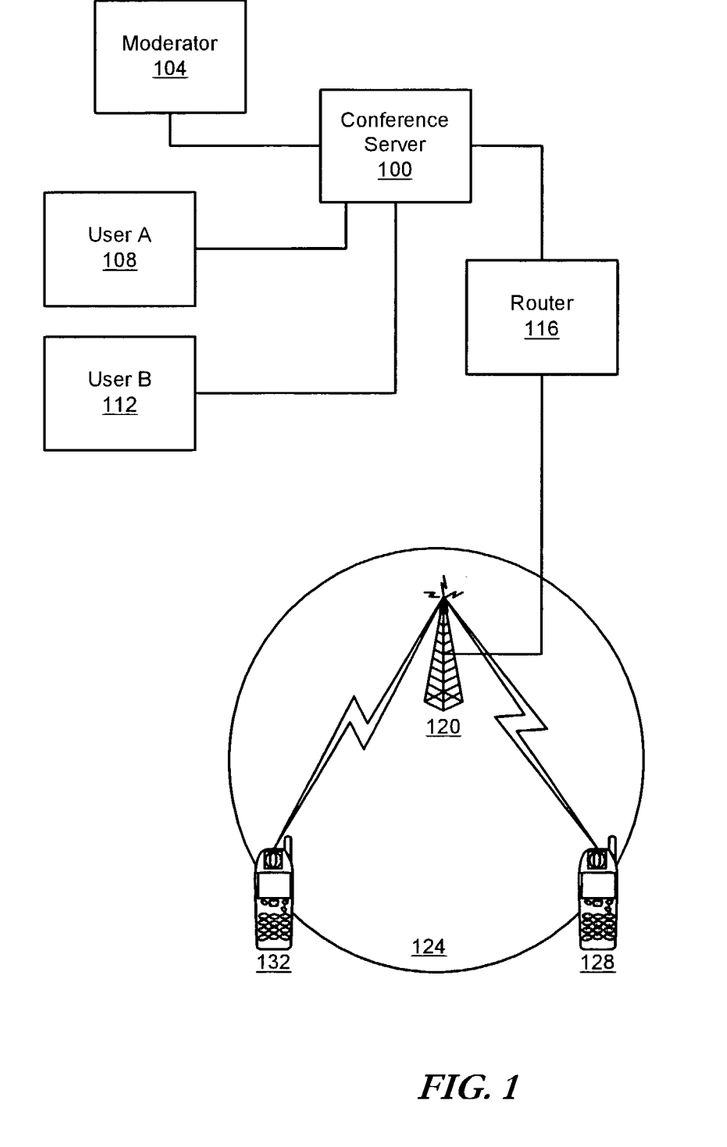
FIG. 1 is a block diagram illustrating an IMS system according to one embodiment of the present invention.

Referring now to FIG. 1, one possible arrangement of an IMS conferencing system is shown. A conference server 100 acts as central control point for IMS conferencing between user terminals or other such multimedia capable devices. One function of the conference server 100 is to control the shared resources. For example, the conference server 100 can control a mixer for selectively choosing the media sources for output to the data streams. It is appreciated that the conference server 100 need not be a standalone server, but may be part of a user terminal/device, for example, where peer-to-peer conferencing is desired.

Also shown in FIG. 1 is a router 116 that can interface to a wireless system 120. The wireless system 120 can establish a Radio Access Network (RAN) 124. Mobile devices 128, 132 can access the RAN and join in conference services provided by the conference server 100.

At least one moderator 104 can act as an overseer in establishing and managing the conference. The moderator 104 and other user terminals 108, 112 send floor control commands to the conference server 100 to change floor status. Depending on the rules of engagement of the conference, floor control can be passed to a user by either manual or automatic approval at the conference server 100. The conference server 100 notifies changes in floor status to the moderator(s) 104 and other participants.

A floor control protocol is used to transport the floor control messages among various users associated with conference. Such a protocol is defined in draft-wu-sipping-floor-control-01.txt by Wu et al., incorporated herein by reference in its entirety. The approach outlined by Wu et al. involves adding extensions to the Session Description Protocol (SDP).

SDP is general-purpose text based protocol used for a wide range of network environments and applications. SDP serves to define certain parameters of a multimedia session and communicates the relevant session setup information to prospective participants. SDP allows a session to be joined by users without the users having a priori knowledge of all the particulars of the underlying session parameters and data streams.

Figure 2:
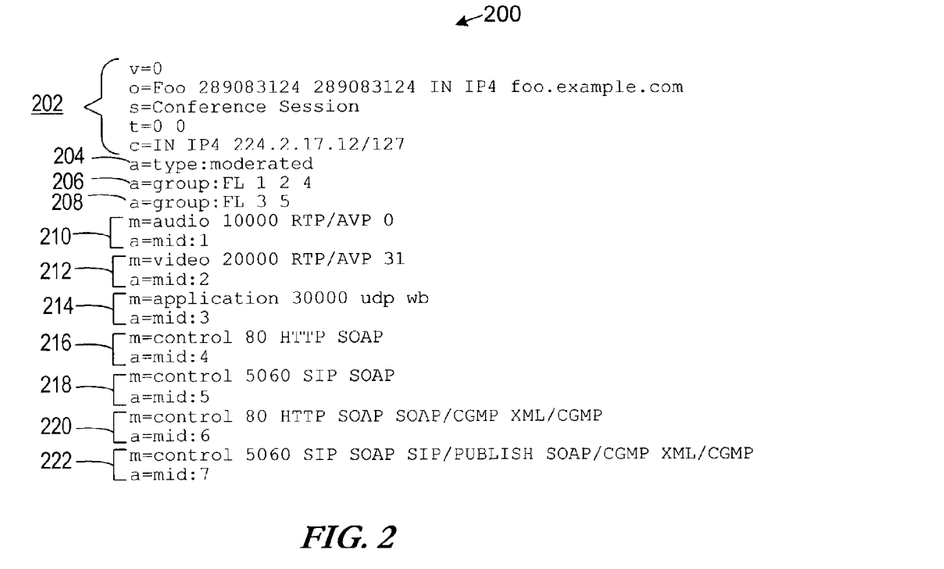
FIG. 2 is an example SDP session description usable for establishing communication channels according to an aspect of the present invention.

Particulars of SDP are described in Internet Engineering Task Force (IETF) RFC 2327. FIG. 2 shows an exemplary SDP session description 200 that could be used to advertise a multimedia conference. The use of SDP for establishing multimedia connections is provided for purposes of example. It is appreciated that concepts according to the present invention can be applied to any form of proprietary or open methods of establishing multimedia connections.

For the purposes of this discussion, the various communication paths that comprise a multimedia connection are referred to as "channels". It is appreciated that a channel as used herein is an abstraction used to designate an a priori agreed upon communication path between terminals/users/servers on the network. Although media channels and control channels are considered concurrently active while a session (e.g. teleconference) is underway, there need not be an active connection at all times during the session. Indeed, when using the HTTP protocol over TCP/IP, for example, a plurality of socket connections are opened and closed after each "GET" or "POST" transaction. It is appreciated that machines on either side of an HTTP session have various methods known in the art to keep track of sessions, states, and identities that do not rely on a continuous socket connection to define a channel.

Referring again to FIG. 2, the purpose of the illustrated SDP session description 200 is to establish a multimedia conference utilizing an audio, video, and a white-board media channels (media channels may alternately be referred to as "streams"). The first lines 202 of the session description 200 is metadata associated with the description 200, including protocol version (v), owner/creator and session identifier (o), session name (s), time the session is active (t) (in this case the session is permanent, since start and stop times are set to 0), and connection information (c) particulars of the conference server.

Line 204 is an attribute line indicating the type of conference. In the example, the session is moderated indicating the use of a floor control tool. The attribute lines 206 and 208 define floor control groups for the audio/video and white board channels.

Each line starting with "m=" field is a media description field. A media field has several sub-fields. The first sub-field is the media type. Currently defined media are "audio", "video", "application", "data" and "control", though this list may be extended as new communication modalities emerge. "Application" is a media flow such as whiteboard information. "Control" is used to specify an additional conference control channel for the session. The second sub-field is the transport port to which the media stream will be sent. The third sub-field is the transport protocol (e.g. RTP/AVP—the IETF's Realtime Transport Protocol using the Audio/Video profile carried over UDP.) The fourth and subsequent sub-fields are media formats.

Lines 210 define an audio channel on port 10000 using RTP Audio/Video profile as payload type 0. The "a=mid:1" part of lines 210 define the media ID of "1" for this channel. Likewise, lines 212, 214, 216, and 218 define channels 2-5, which correspond to video, white board, AV control, and whiteboard control channels, respectively.

Referring back to line 206, it can now be seen how the "FL" semantic of line 206 groups the audio and video channels 210, 212 with the AV control channel 216. Similarly, line 208 defines the grouping of the whiteboard channel 214 with its associated control channel 218.

Figure 3:
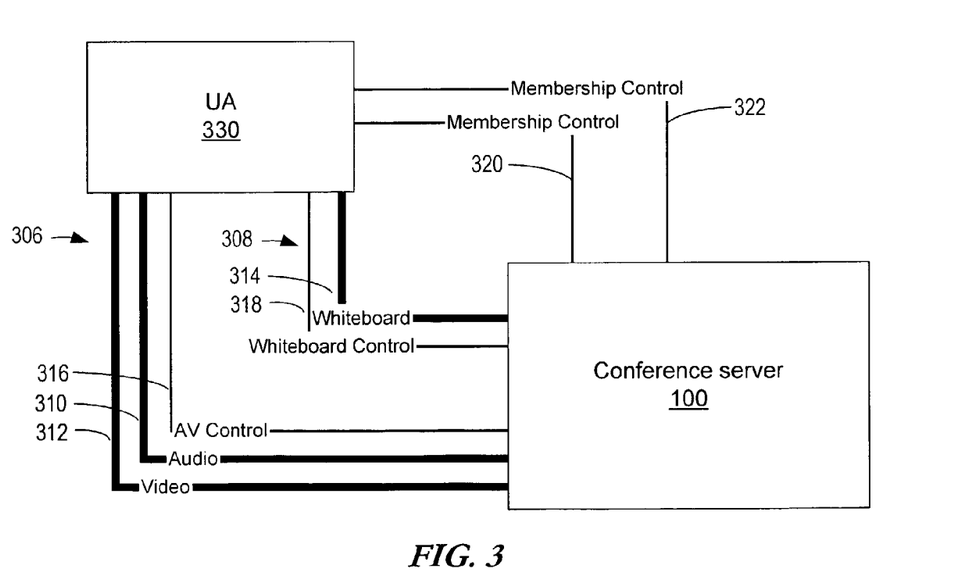
FIG. 3 is a block diagram illustrating grouping of channels for a multimedia session according to an embodiment of the present invention.

FIG. 3 illustrates how the connections according to the SDP session description 200 may be represented between the conference server 100 and a user agent (UA) 330. The user agent 330 may be any form of terminal or device capable of communicating over a network, including computing equipment, personal digital assistants, wireless/wired telephonic apparatus, etc. The groupings 306, 308 are defined in the session descriptions 206, 208 and are shown as sets of adjacent connection lines. The AV grouping 306 contains the audio and video RTP streams 310, 312 and the AV control channel 316. The whiteboard grouping 308 contains the whiteboard data channel 314 and the whiteboard control channel 318.

As defined in line 216 of the session description 200, the AV control channel 316 uses the Hypertext Transfer Protocol (HTTP) as a transport protocol, whereas the whiteboard control channel 318 uses SIP as a transport protocol (defined in line 218 of FIG. 2). The data format for both channels 316, 318 is the Simple Object Access Protocol (SOAP). SOAP allows making Remote Procedure Calls (RPC) using the Extensible Markup Language (XML) over SIP or HTTP. It is appreciated that alternate XML based mechanisms can be used in place of SOAP for making RPC calls. Because HTTP, XML, SIP, and SOAP are open and widely implemented, the use of these protocols can provide rich functionality without relying on proprietary or non-standard RPC mechanisms for floor control.

The floor control protocol does not deal with the conference management such as how to elect the moderator of the conference. Neither does it deal with the policies in the conference server such as who can join the conference. It is an object of the present invention to show how group management can be implemented in IMS conferencing and other applications by utilizing concepts associated with creation of floor control channels.

In one aspect of the present invention, one or more membership control channels are created between the conference server 100 and UAs, the UAs including moderators and users. Two such exemplary control channels 320, 322 are shown in FIG. 3. Although there may be one or more active membership control channels open during a session, usually only a single channel will be used. More than one channel may be beneficially designated so that UAs may choose from different transport and application level protocols.

Referring back to FIG. 2, lines 220 and 222 define the two side channels 320, 322 that can be used for membership control. The channel in line 220 uses HTTP for transport while the channel in line 222 uses SIP for transport. The SIP channel 222 is defined as using the SIP "PUBLISH" method, although other SIP methods such as "MEMBER" or other proposed but not yet standardized methods may also be used. In both cases, a group management protocol is used to provide conference management capabilities.

Group management protocols can be implemented using a protocol that defines a set of operations for creating and managing groups of users. Those operations could, for example, be implemented using XML-based or SOAP commands. In the example of FIG. 2, the Client Group Management Protocol (CGMP) is used to provide conference management capabilities. CGMP is a SOAP based protocols that implements the required group management functions. It is appreciated that group management operations are not limited to using CGMP, but CGMP is used herein as illustrative of certain operations required to manage multimedia groups.

Once a membership control channel has been defined, the moderator 104 can create access lists, mass invitation lists, or other user identity data collections defined in the CGMP specification or otherwise known in the art. It is appreciated that where group management functions are described herein in terms of CGMP, alternative protocols, either existing or yet to be defined, may be suitable replacements for CGMP to provide functions within a membership control channel. The moderator 104 sends this list to conference server 100, which stores the list and returns a publishable reference to the list. This publishable reference is typically a Uniform Resource Locator (URL), which is the standard way of locating data on IP networks. This concept is shown in FIGS. 4 and 5.

Figure 4:
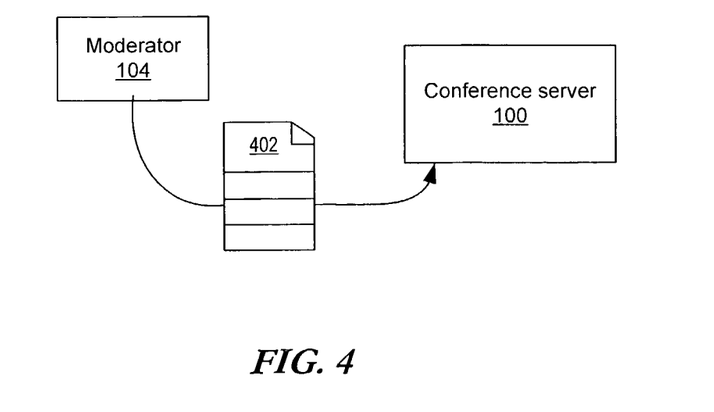
FIG. 4 is a block diagram illustrating an exemplary group management message being passed to a conference server according to an aspect of the present invention.

In FIG. 4, the moderator 104 sends the conference server a list 402 of user identity records. The list 402 may be an invitation list, access list or any combination thereof. The list 402 may be sent by any method of transferring data, including HTTP/SOAP, email (SMTP), HTTP "POST", Java Applet, etc. For the purposes of this example, the list 402 will be sent using CGMP and some sort of RPC mechanism such as HTTP/SOAP.

Figure 5:
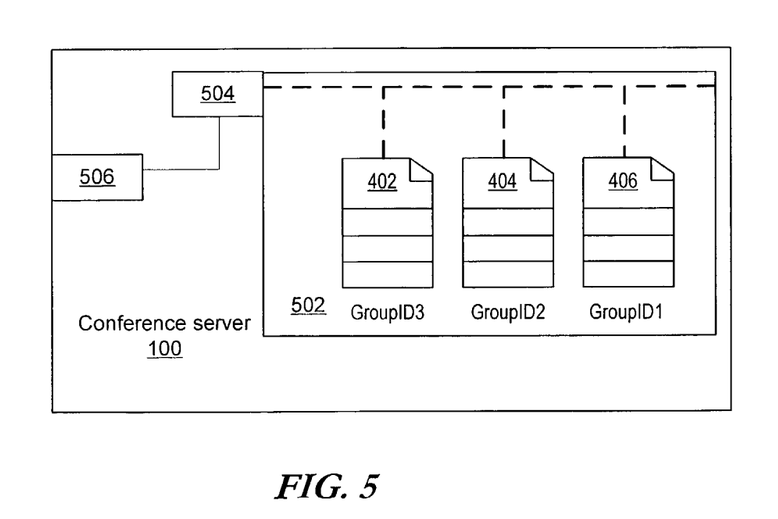
FIG. 5 is a block diagram of the conference server showing arrangement of group management user lists.

After the list 402 is submitted to the conference server 100 as shown in FIG. 4, the list 402 is added to a collection which may include other access lists 404, 406, as seen in FIG. 5. The conference server 100 stores the list collection in memory 502 which can be accessed by a processor 504 for adding, deleting, and modifying lists.

The list 402 is given an ID, which in this case is GroupID3. The user identity records contained within the list 402 may be resolved at the conference server 100 to enumerate users, check validity, check availability of users, and any other verification tasks. The lists 402, 404, 406 stored on the conference server are published (e.g. made accessible by a data transmission module 506). The conference server 100 will also notify the moderator 104 that the list 402 has been added and return a "handle" to the published list, such as a URL that uniquely identifies each published list on the conference server 100.

Figure 6:
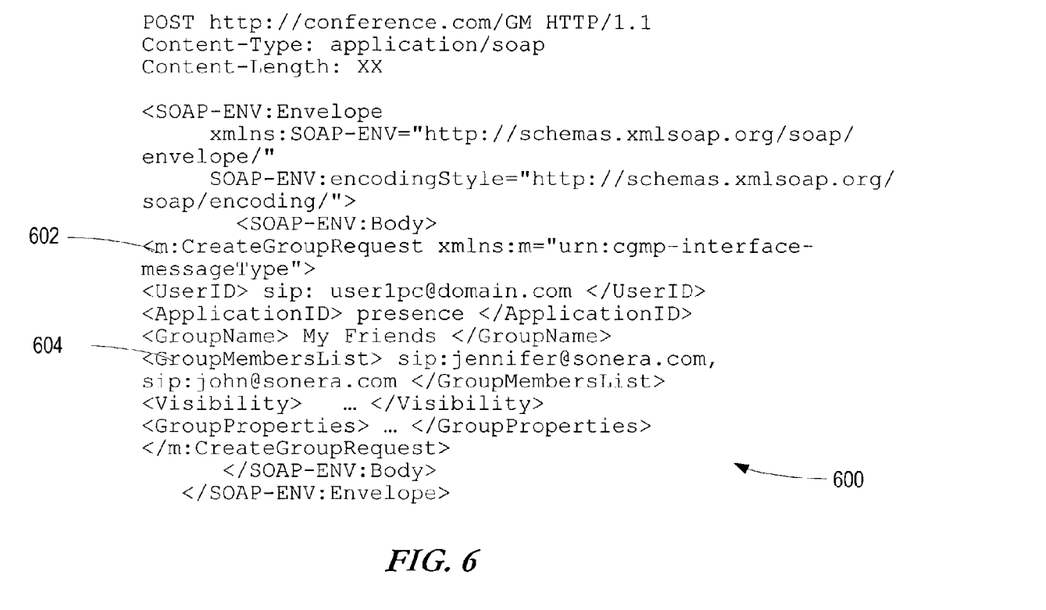
FIG. 6 is an HTTP code excerpt showing the establishment of a user list using a POST operation according to the principles of the present invention.

An example of an HTTP session wherein the moderator sends the list using SOAP is shown in FIG. 6. FIG. 6 is a sample HTTP "POST" operation 600 where a CGMP call is made using SOAP. The purpose of this call is to create a user group called "My Friends" on the conference server 100. As indicated on line 602, the SOAP envelope is making a "CreateGroupRequest" call as indicated on line 602. CreateGroupRequest is sent by a UA to create a membership group. The CreateGroupRequest involves passing in parameters such as a group name, participant list, and other group and member properties.

The members list in the CreateGroupRequest is shown on line 604. This group contains two users, "sip:jennifer@sonera.com" and "sip:john@sonera.com". Note that the users in this example are defined using a SIP Uniform Resource Identifier (URI), which is a format similar to an email address.

Figure 7:
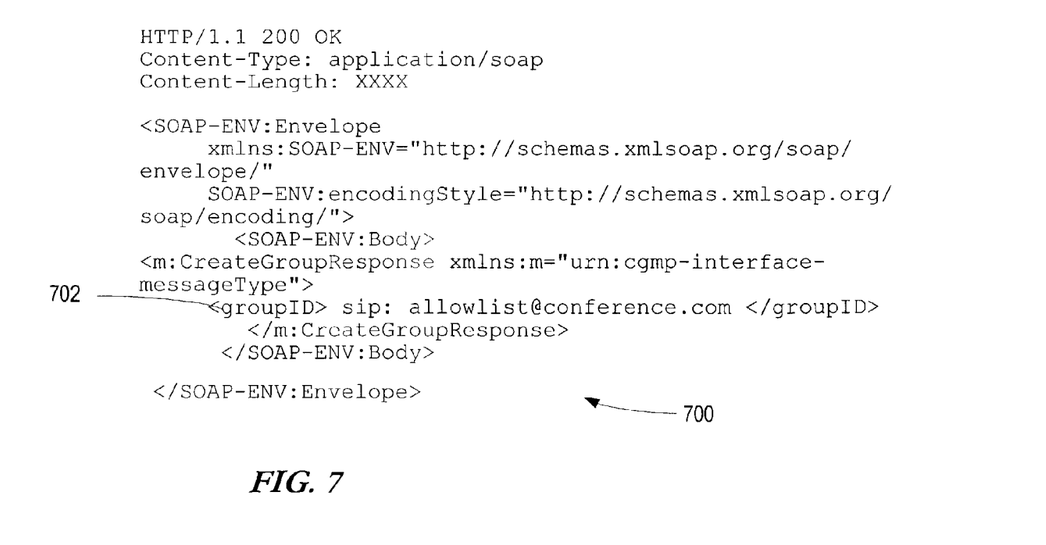
FIG. 7 is an HTTP code excerpt showing a server response to the post operation shown in FIG. 6.

Once the CreateGroupRequest shown in FIG. 6 has been posted, the conference server 100 would respond with an HTTP response, an example of which is shown in FIG. 7. The HTTP response 700 is a SOAP encoded message. On line 702, it can be seen that the conference server has assigned this list the group ID of "sip:allowlist@conference.com". Note, the list's group ID is also a URI similar to the ID of individual users in the list.

Figure 8:
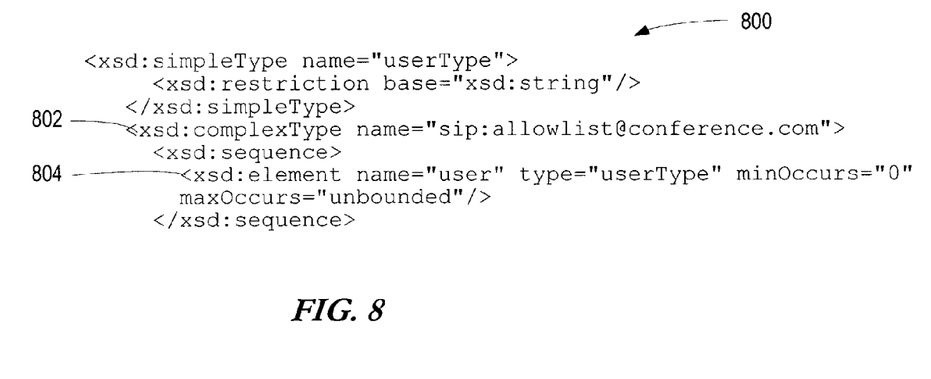
FIG. 8 is an XML schema fragment showing a user list data representation according to an embodiment of the present invention.

After obtaining the group ID from the conference server's HTTP response 700, the moderator 104 can use the group ID to send a floor control primitive to define the users that can claim the floor. The XML fragment 800 in FIG. 8 illustrates how this is done. The fragment 800 is a schema of type "userType" which can contain either the URI of the user list as shown in line 802 or a list of "user" elements as shown in line 804.

Figure 9A:
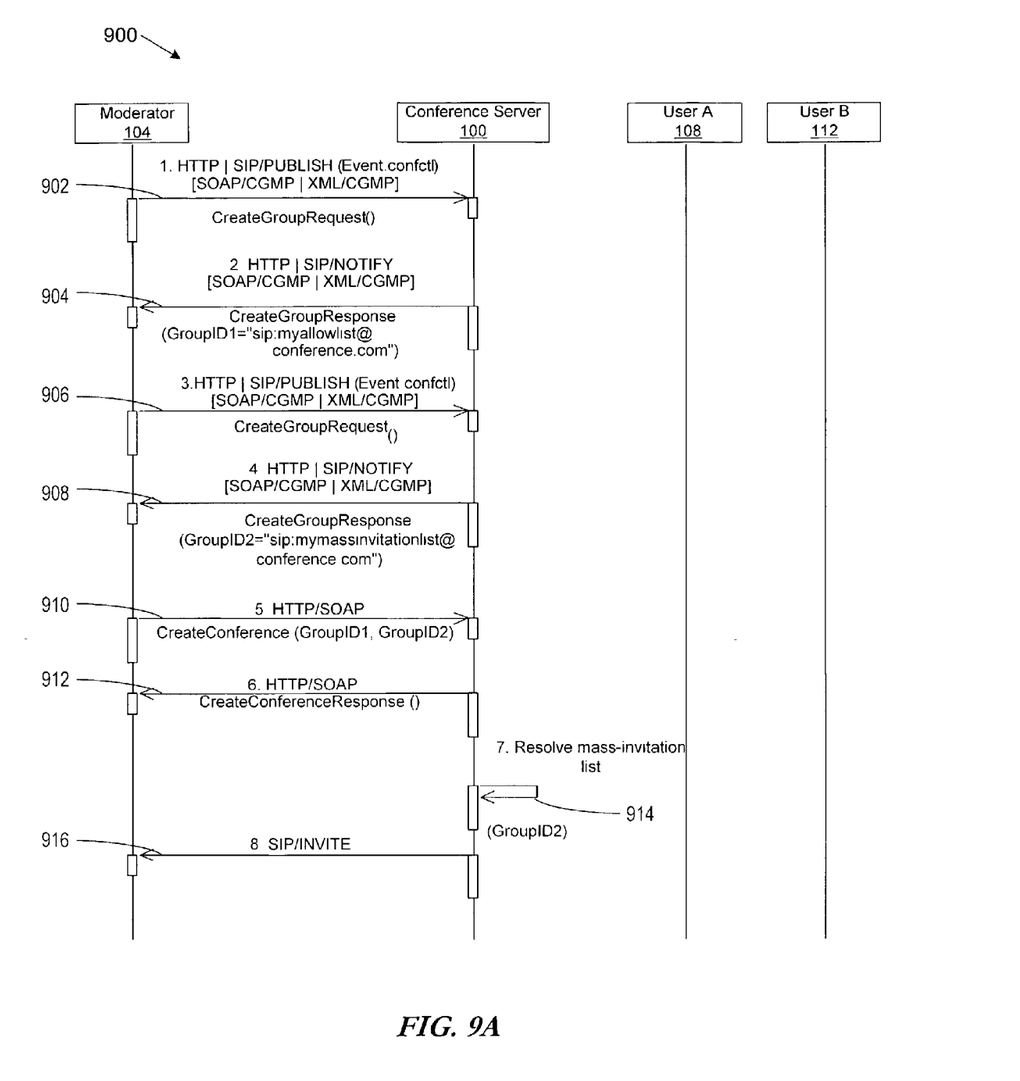
FIG. 9A is a sequence diagram showing establishment of user groups by a moderator before a conference begins according to an aspect of the present invention.
Figure 9B:
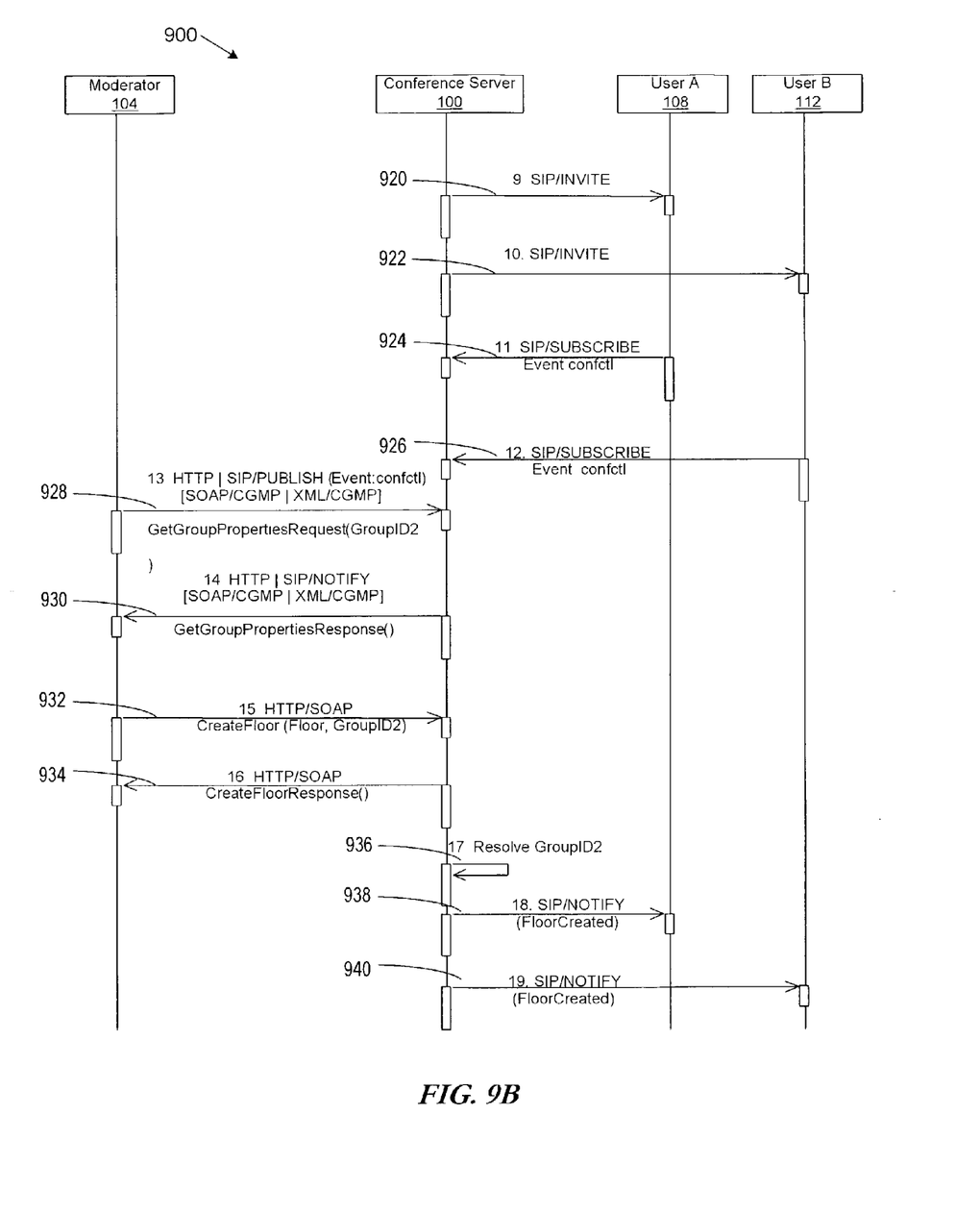
FIG. 9B is a sequence diagram continuing from FIG. 9A showing establishment of user groups by a moderator before a conference begins according to an aspect of the present invention.

A system according to the present invention can be used to establish user lists for a conference before and during the conference. Turning now to FIGS. 9A and 9B, a sequence diagram 900 illustrates how groups are established when the moderator 104 creates the access lists before the conference begins. After creating an access list, the moderator 104 sends a CreateGroupRequest RPC to the conference server 100 either using SOAP or XML at event 902. The conference server 100 responds with a response event 904, the event 904 including the URL of the created group. At event 906, the moderator 104 sends a mass invitation list using CreateGroupRequest, and the conference server 100 responds with event 908 which includes the URL for the mass invitation list.

The moderator 104 now initiates event 910, which is a call to CreateConference. As parameter of the CreateConference procedure call, the group IDs of the access and mass invitation lists are included so that the users in these lists can be invited and given the appropriate floor control access. Event 912 is the response from the conference server 100 to the moderator 104 for the CreateConference procedure.

At event 914, the conference server 100 resolves the invite and access lists in order locate and contact the invitees. At event 916 in FIG. 9A and events 920 and 922 of FIG. 9B, the conference invitations are delivered via SIP to the moderator 104, user A 108, and user B 112, respectively. The SIP "INVITE" method includes an SDP descriptor used to define the channels for floor control and membership management. The channels may also be used for meta-management.

At events 924 and 926, user A 108 and user B 112 respond by subscribing to the conference using the "SUBSCRIBE" method of SIP. Using SUBSCRIBE method for subscribing and NOTIFY method to inform about changes, implements a synchronous method for notification of any changes in the conference or membership of the participant status. An asynchronous mechanism can be implemented using SIP MESSAGE method that is sent automatically from the conferencing server to all the members in the list of participants created with the herein defined conference group management protocol. In the asynchronous mechanism the body of the SIP MESSAGE can include any content-type that is readable either to the user (i.e. text data) or terminal readable (i.e. calendar invitation, etc).

At event 928, the moderator 104 makes a GetGroupPropertiesRequest procedure call to get specific group information and group properties as well as service specific information. The GetGroupPropertiesResponse is sent from the conference server 100 to the moderator 104 at event 930.

At event 932 in FIG. 9B, the moderator 104 calls the CreateFloor procedure at the conference server using a group ID. In this case, the group ID is that of the mass invitation list. The conference server 100 responds at event 934 with a CreateFloorResponse. At event 936, the conference server 100 again resolves the group list, and then sends SIP NOTIFY events 938 and 940 to inform users A 108 and B 112 of floor creation.

Figure 10A:
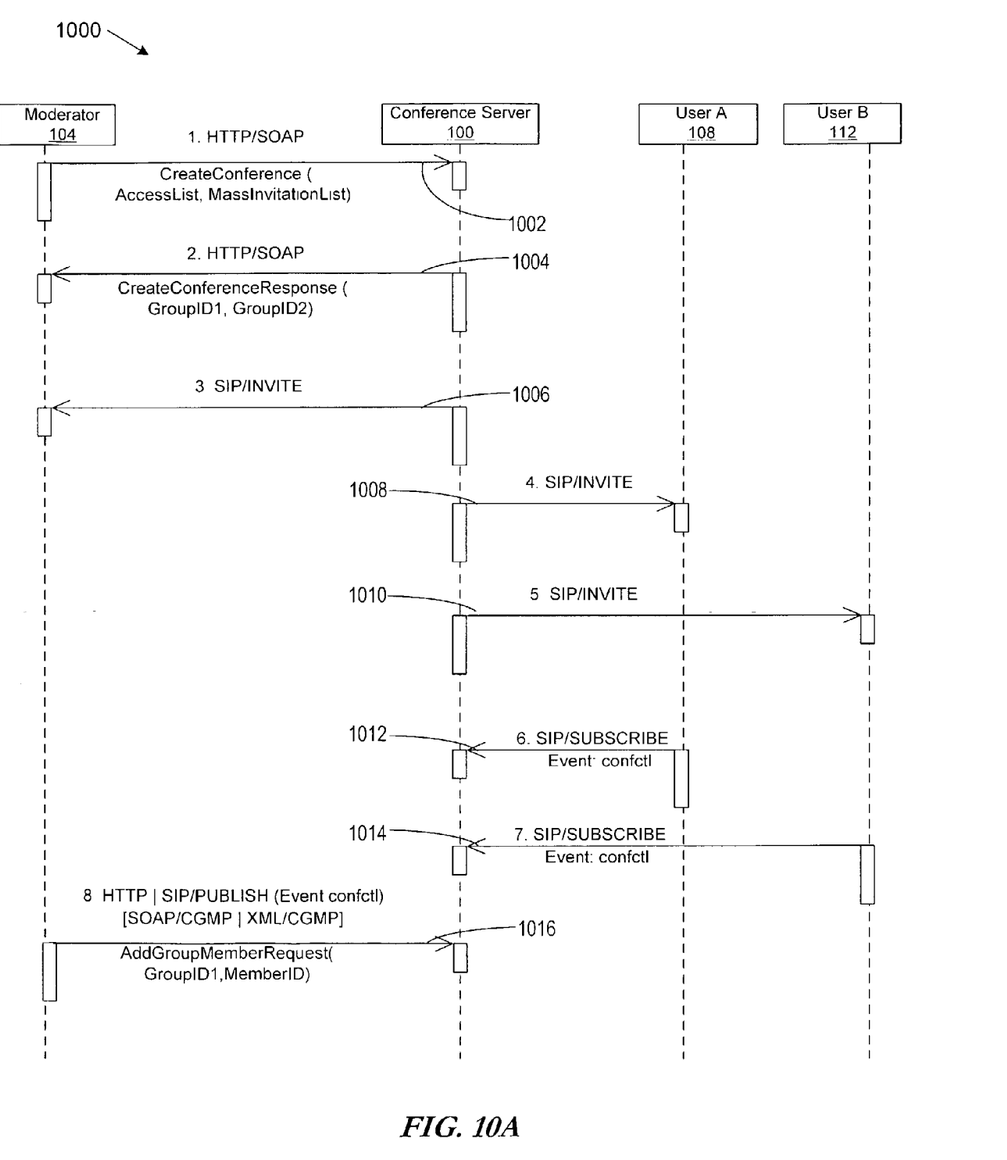
FIG. 10A is a sequence diagram showing establishment of user groups according to another aspect of the present invention.
Figure 10B:
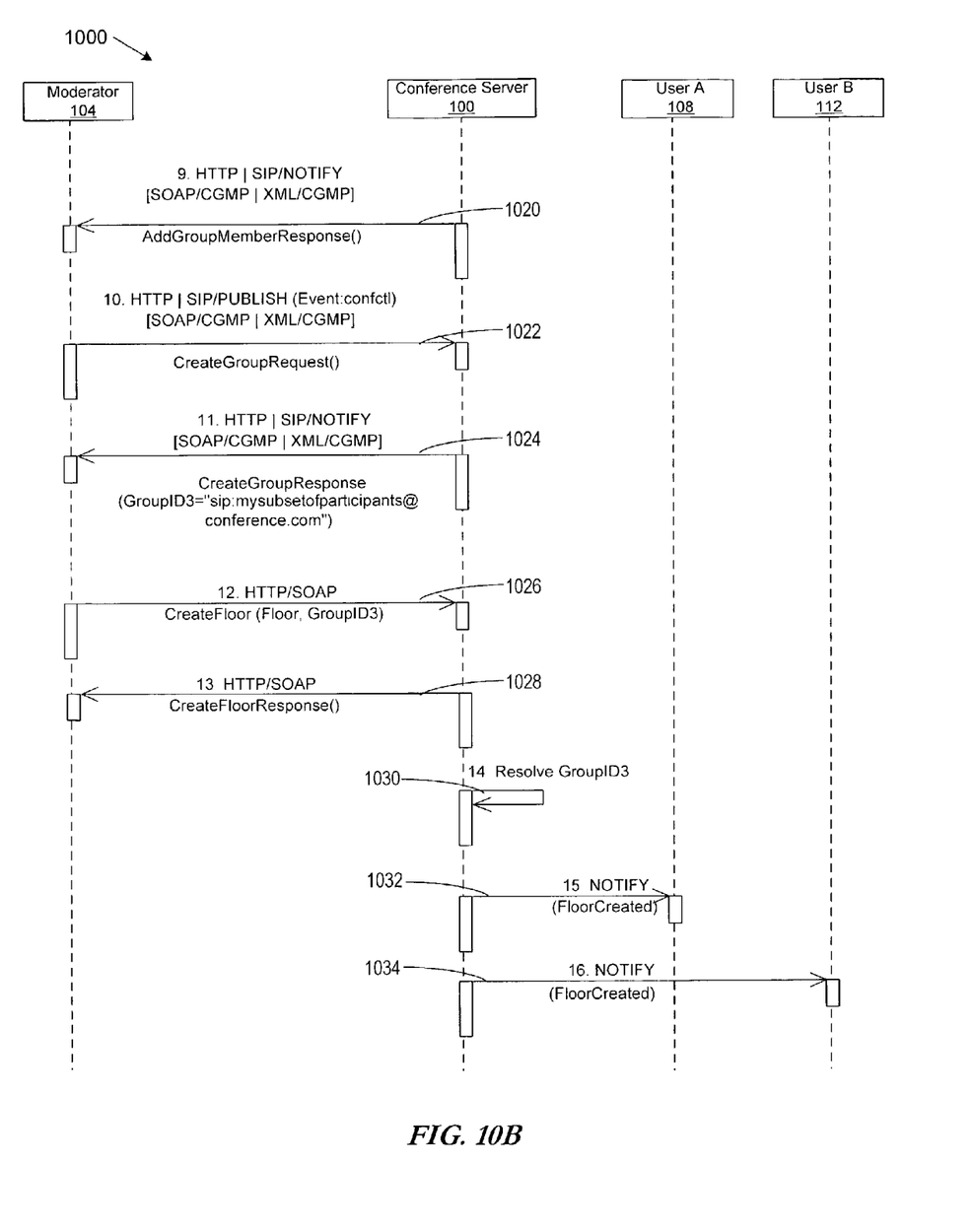
FIG. 10B is a sequence diagram continuing from FIG. 10A showing establishment of user groups according to another aspect of the present invention.

The sequence diagram 1000 in FIGS. 10A and 10B illustrate another scenario of conference creation according to an embodiment of the present invention. In this scenario, CGMP is used online during an ongoing conference. Events 1002, 1004, 1006, 1008, 1010, 1012, and 1014 are conference establishment steps similar to those described regarding FIGS. 9A and 9B. At event 1016, an AddGroupMember request is sent by the moderator 104 to the conference server 100. The request includes the MemberID of the user to be added and the group ID (GroupID1) of the group to which the user is to be added. The conference server 100 responds to the moderator 104 at event 1020 with an AddGroupMemberResponse in FIG. 10B.

At event 1022, the moderator 104 requests a CreateGroup procedure call and the conference server 100 responds with event 1024. The conference server 100 creates another group (GroupID3) and publishes a URL for that group in the CreateGroupResponse of event 1024. In events 1026 (request) and 1028 (response), the moderator 104 creates the floor for the newly created group. The new group is resolved in step 1030 and participants are notified of the newly created floor by events 1032 and 1034 using SIP NOTIFY method if the participants used a SUBSCRIBE method with the conference URI. The conference server can also inform the participants about the created floor by sending them a SIP MESSAGE method that is asynchronous and does not require a previous SUBSCRIBE.

Figure 11:
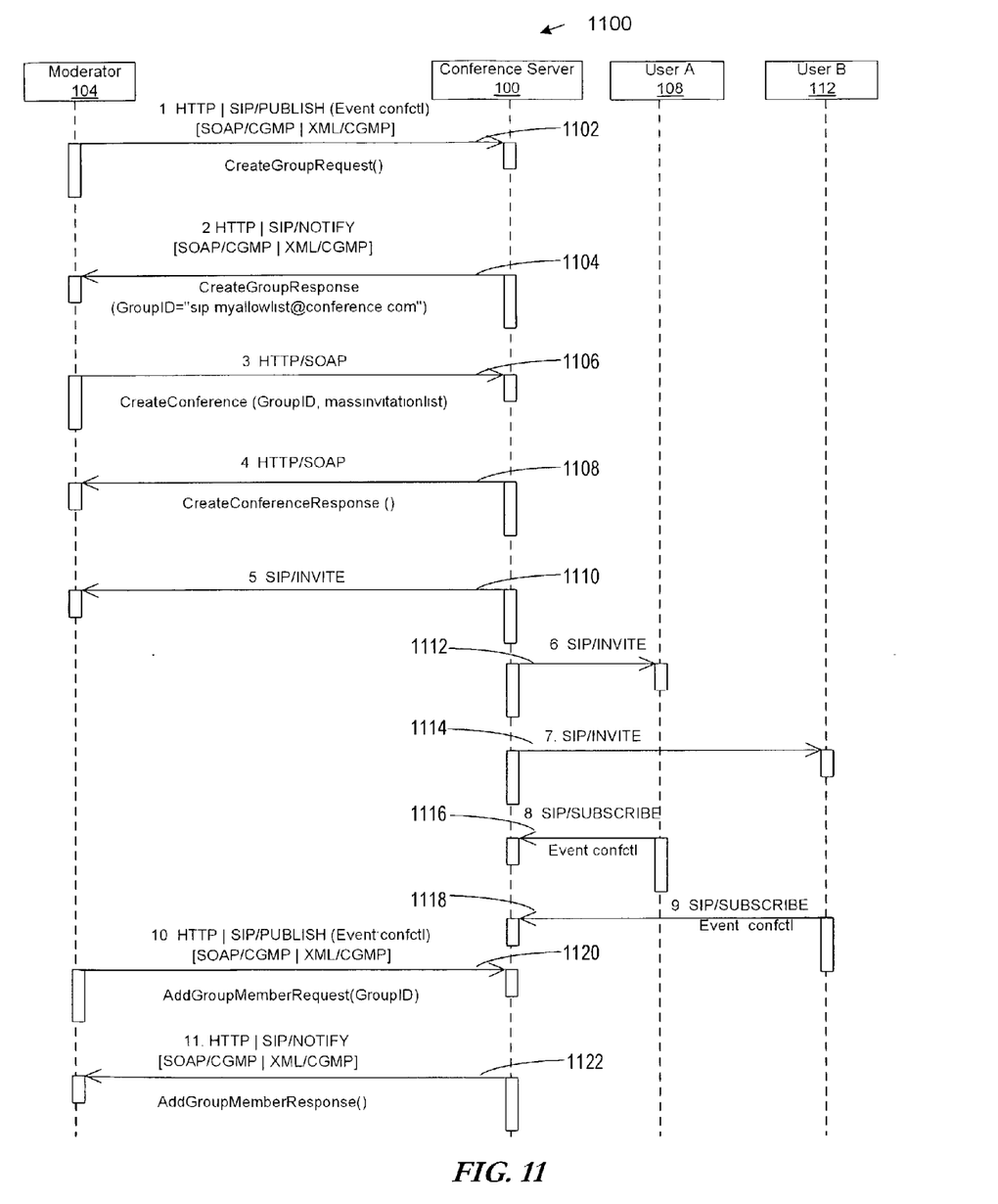
FIG. 11 is a sequence diagram showing establishment of user groups according to yet another aspect of the present invention.

The sequence diagram 1100 in FIG. 11 shows a scenario where an "allow list" is created either on-line or off-line and the moderator 104 decides to manage the allow list. Managing the allow list may include adding members, removing members, modifying member properties, etc. Note that the allow list is not typically used to manage user interactions while the conference is going on. Those functions are provided by the user management protocol. The allow list in this example is accessed by the conference server 100 when sending invitations and can also be accessed by other agents on the network for various other uses not related to an ongoing meeting.

Similar to the procedures previously described in relation to FIG. 9A, events 1102, 1104, 1106, and 1108 in FIG. 11 are standard events used to create an allow list and create a publishable reference to the allow list. Similarly, events 1110, 1112, 1114, 1116, and 1118 invite and join participants as previously described. Event 1120 is an AddGroupMember request to add another member to the existing allow list. This event 1120 could also be any other CGMP group management request, such as DeleteGroupMember to remove a member from the allow list. Event 1122 is the standard conference server 100 response to the request 1120.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A method for group management of multimedia conference sessions between at least one conference server and a plurality of user terminals coupled to the conference server via a network, wherein the multimedia conference sessions utilize multimedia data channels and control data channels, the method comprising:
   creating a conference request at a moderator terminal;
   configuring the conference request by specifying a member list comprising a plurality of user identity records;
   communicating the conference request to the conference server over a membership control channel; adding the member list to a collection of access lists and storing the member list and collection of access lists at the conference server;
   notifying the moderator terminal that the member list has been added to the collection of access lists;
   publishing the member list and access lists stored at the conference server; and
   uniquely identifying the published lists on the conference server for defining a conference session.

2. The method of claim 1, further comprising creating a floor control list from the member list, the floor control list usable for allowing floor control access to the conference session as part of floor control management.

3. The method of claim 1, wherein the member list comprises a mass invitation list.

4. The method of claim 1, wherein the member list comprises an access list.

5. The method of claim 1, wherein the membership control channel uses HTTP as a transportation protocol.

6. The method of claim 1, wherein the membership control channel uses SIP as a transportation protocol.

7. The method of claim 1, wherein the membership control channel uses an XML based protocol for group management.

8. The method of claim 7, wherein the membership control channel uses CGMP for group management.

9. The method of claim 7, wherein the membership control channel uses SOAP for group management.

10. The method of claim 1, further comprising modifying the member list to add and remove user identity records from the member lists.

11. The method of claim 10, wherein modifying the member list further comprises modifying the member list to add and remove user identity records from the member list while the plurality of user terminals is engaged in an active multimedia conference.

12. The method of claim 1, wherein publishing the member list and access lists stored at the conference server comprises making the lists accessible by a data transmission module.

13. The method of claim 1, wherein the published lists are uniquely identified by a Universal Resource Locator (URL).

14. A conferencing server capable of being coupled to a plurality of devices capable of communication over a network, each device capable of being coupled to the conferencing server via concurrently active control channels and media channels, the conferencing server comprising:
   a memory configured to store a plurality of member lists, each member list comprising one or more user identity records;
   a processing system coupled to the memory and configured to identify at least one member list and provide a publishable reference to the at least one member list to one or more of the devices, and to notify a moderator terminal when a list is added to the conferencing server; and
   a data transmission module coupled to the processing system to communicate the at least one member list to a device over one of the control channels defined as a membership management channel to establish a multimedia conference over the membership management channel;
   wherein the publishable reference is uniquely identified for defining the multimedia conference.

15. The conferencing server of claim 14, wherein one of the control channels is defined as a floor control channel, and wherein the processing system is configured to create a floor control list from the at least one member list, the data transmission module communicating the floor control list to a device over the floor control channel.

16. The conferencing server of claim 14, wherein the member list comprises a mass invitation list.

17. The conferencing server of claim 14, wherein the member list comprises an access list.

18. The conferencing server of claim 14, wherein the membership management channel uses SIP for transport.

19. The conferencing server of claim 14, wherein the membership management channel uses HTTP for transport.

20. The conferencing server of claim 14, wherein the membership management channel uses an XML-based protocol for group management.

21. The conferencing server of claim 20, wherein the membership management channel uses CGMP for group management.

22. The conferencing server of claim 20, wherein the membership management channel uses SOAP for group management.

23. The conferencing server of claim 14, wherein the processing system is configured to add and remove user identity records from one or more of the member lists.

24. The conferencing server of claim 23, wherein the processing system is configured to add and remove user identity records from one or more of the member lists while users corresponding to one or more identity records are engaged in an active multimedia conference.

25. A multimedia system, comprising:
a plurality of user agents, the user agents engagable in a multimedia conference utilizing multimedia data channels and control data channels;
at least one moderator terminal configured to create a member list request; and
at least one conference server configured to:
receive a member list request from the at least moderator terminal over one of the control data channels defined as a membership management channel established between the conference server and the at least one moderator terminal;
store the member list request as a member list, the member list comprising one or more user identity records;
notify the moderator terminal that the member list has been stored; and
communicate the member list to the plurality of user agents via a publishable reference; wherein
the publishable reference is uniquely identified for defining the multimedia conference.

26. The multimedia system of claim 25, wherein the at least one conference server is configured to create a floor control list from the member list and communicate the floor control list to at least one of the user agents over a floor control channel.

27. The multimedia system of claim 25, wherein the member list request comprises a mass invitation list request.

28. The multimedia system of claim 25, wherein the member list comprises an access list request.

29. The multimedia system of claim 25, wherein the membership management channel uses SIP for transport.

30. The multimedia system of claim 25, wherein the membership management channel uses HTTP for transport.

31. The multimedia system of claim 25, wherein the membership management channel uses an XML-based protocol for group management.

32. The multimedia system of claim 31, wherein the membership management channel uses CGMP for group management.

33. The multimedia system of claim 31, wherein the membership management channel uses SOAP for group management.

34. The multimedia system of claim 25, wherein the conference server is configured to add and remove user identity records from the member list.

35. The multimedia system of claim 34, wherein the conference server is configured to add and remove user identity records from the member list while user agents are engaged in an active multimedia conference.

36. The multimedia system of claim 34, wherein the conference server is configured to receive a subscription for conference status changes and membership status changes.

37. The multimedia system of claim 34, wherein the conference server is configured to send a synchronous membership status change notification.

38. The multimedia system of claim 34, wherein the conference server is configured to send an asynchronous membership status change notification.

* * * * *